D. M. LUEHRS.
SPRAYING DEVICE AND MEANS FOR CONTROLLING THE SAME.
APPLICATION FILED FEB. 19, 1909.
1,154,707.
Patented Sept. 28, 1915.
3 SHEETS—SHEET 1.
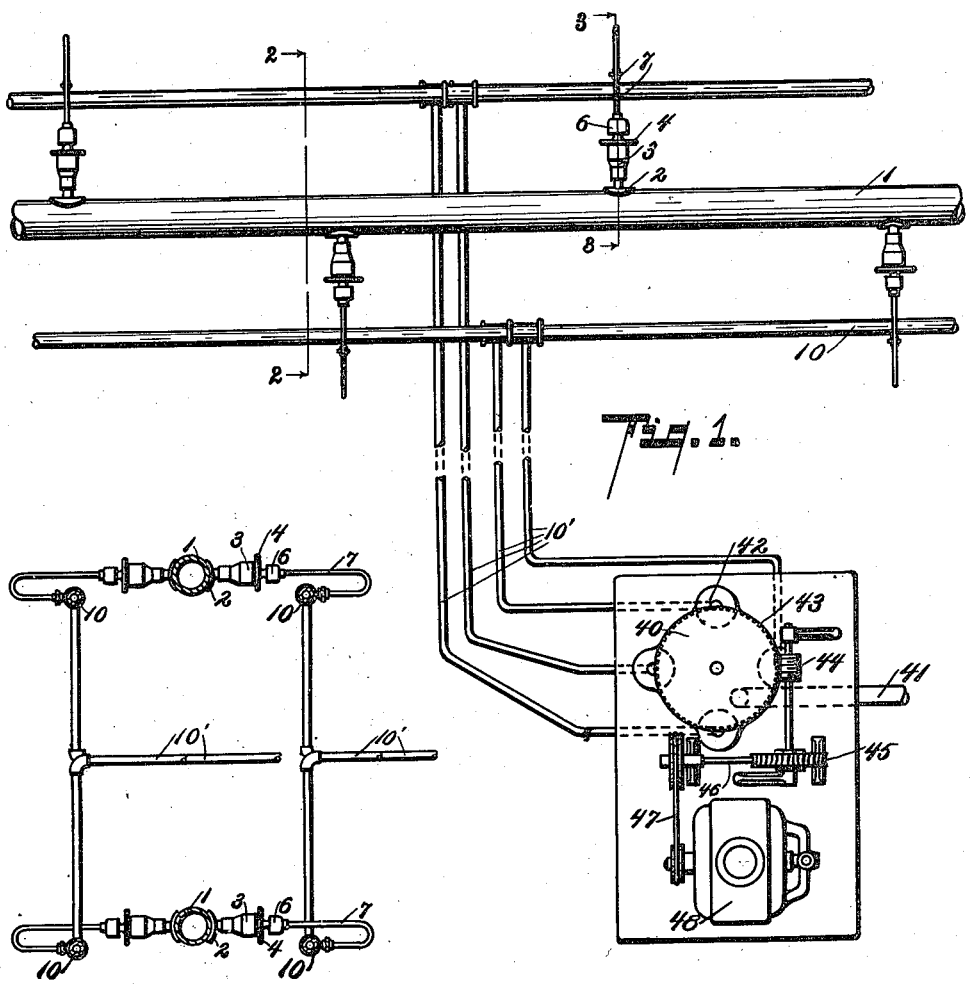
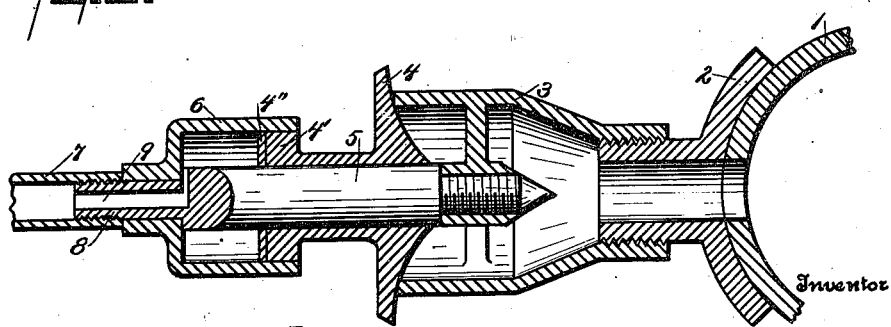

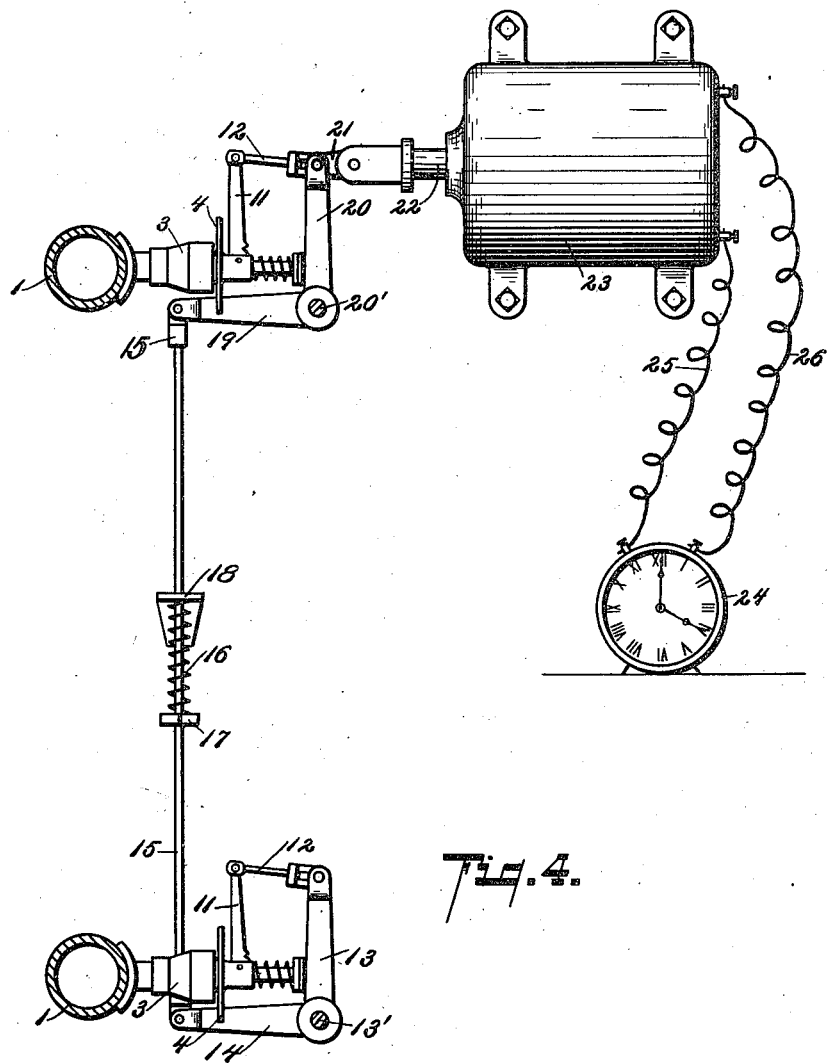

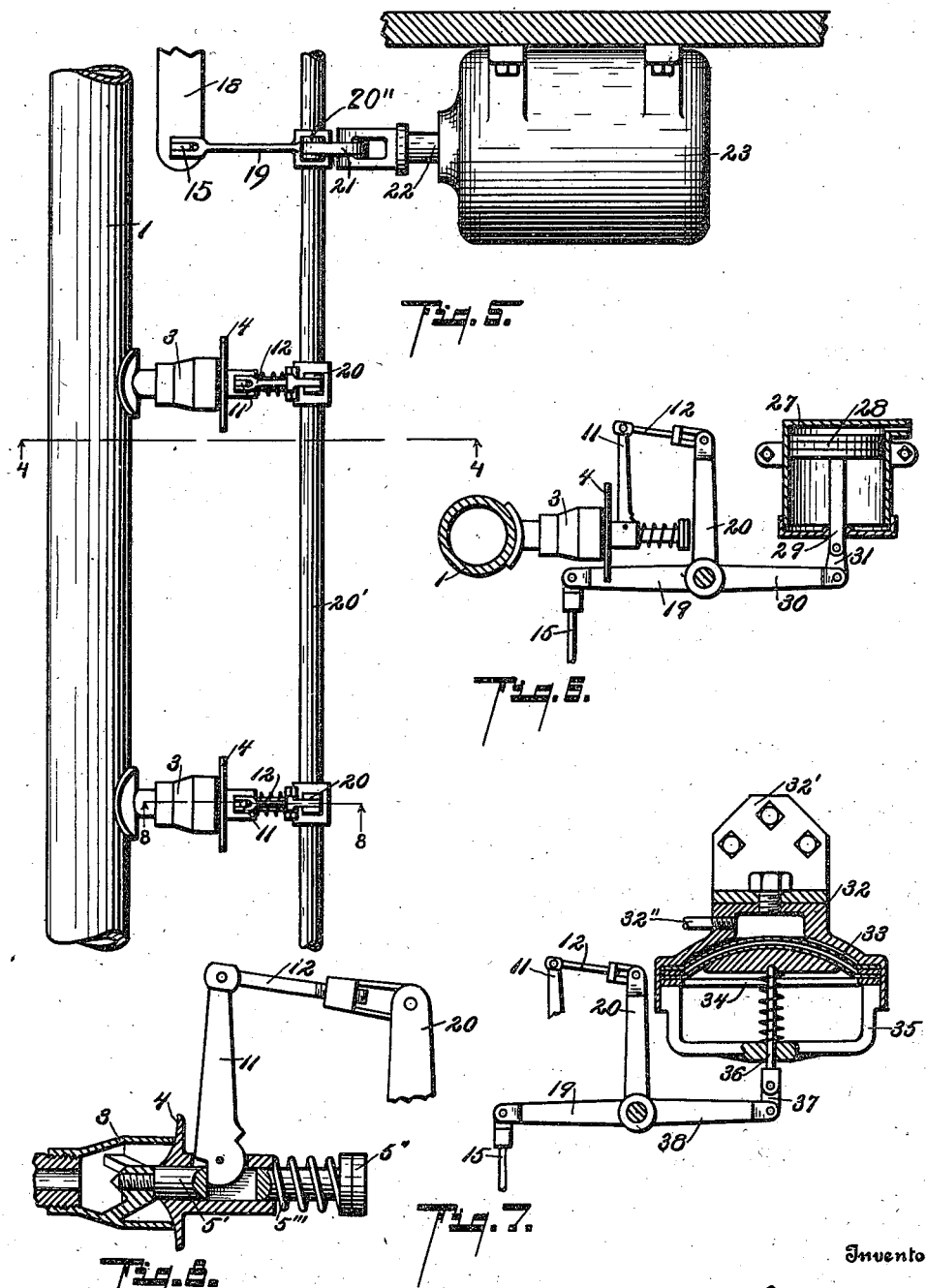

UNITED STATES PATENT OFFICE.

DANIEL M. LUEHRS, OF TOLEDO, OHIO, ASSIGNOR TO McCREERY ENGINEERING COMPANY, OF TOLEDO, OHIO.

SPRAYING DEVICE AND MEANS FOR CONTROLLING THE SAME.

1,154,707. Specification of Letters Patent. Patented Sept. 28, 1915.

Application filed February 19, 1909. Serial No. 478,797.

*To all whom it may concern:*

Be it known that I, DANIEL M. LUEHRS, a citizen of the United States, residing at Toledo, county of Lucas, State of Ohio, have invented certain new and useful Improvements in Spraying Devices and Means for Controlling the Same, of which the following is a specification.

This invention relates to improvements in spraying devices and means for controlling the same.

It relates specifically to improvements in certain details in the structure appearing in my Patent No. 962,512, dated June 28, 1910, for spray heads, and in other particulars to improved means for controlling spray heads automatically, intermittently and from a distant point.

The objects are, First, to provide an improved controlling means for such spray heads, preferably consisting of fluid pressure devices. Second, to provide an improved means for intermittently controlling such spray heads. Third, to provide improved means for automatically controlling such heads whereby, when they are released, they will readily open for flushing purposes. Fourth, to provide improved means for simultaneously controlling a number of heads from one place, whereby they will be evenly and effectively controlled and also flushed. Fifth, to provide improved means for controlling the heads at intervals whereby the flushing can be timed effectively.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which:

Figure 1 is a detail plan view of my improved apparatus in position in its preferred form, portions of the controlling pipes and supply pipes being broken away. Fig. 2 is a transverse detail sectional elevation, taken on a line 2—2 of Fig. 1, showing the relation of the water and air pipes and connections. Fig. 3 is an enlarged detail sectional view, through one of the spray heads, showing the preferred form of fluid pressure control and regulation. Fig. 4 is an enlarged detail sectional view, similar to Fig. 2, showing a modification in which the control is by the electric current, the same being taken on line 4—4 of Fig. 5. Fig. 5 is a plan view of the structure appearing in Fig. 4. Fig. 6 is a detail view of another modification in which the control is by motor cylinder with connections. Fig. 7 is a detail sectional view of a controller consisting of a diaphragm motor and connection. Fig. 8 is a detail view of the valve construction as it is controlled by these modified devices. The preferred construction is by the direct fluid pressure action, as appears in Figs. 1, 2 and 3.

In the drawing, all of the sectional views are taken looking in the direction of the little arrows at the ends of the section lines, and similar characters of reference refer to similar parts throughout the several views.

Considering the numbered parts of the drawing, the main pipe 1 is provided at intervals with spray heads. These are secured thereto by a flange 2 having a screw-threaded nipple which receives the body or shell 3 of the spray head. A spider extends across this shell, and to it is secured a central column 5 on which reciprocates the valve disk 4. This valve disk is formed on its contacting side with a parabolically curved surface, as described in my patent above referred to. The valve 4 is connected to the piston 4'. This valve disk and piston 4' reciprocate on the column 5. The piston 4' in the cylinder 6 is provided with a suitable packing, preferably consisting of a washer as 4". Air is delivered under pressure and under control through the pipe or tube 7, which is secured on to the nipple 8, the passage 9 to the cylinder being through the end of the column 5 and then laterally to the outer end of the cylinder. The pipes 7 for the entire series of valves are connected to a common source of supply 40 indirectly through pipes 10 and 10', whereby the same can be controlled and thus secure the flushing of all the valves in successive groups. This enables a properly timed valve mechanism to open the heads at proper intervals.

When the pipe 10' is open, like the pipe of an air brake, all of the spray heads on that connection will be opened by the pressure of the water against the valve disk, and, when the pressure is turned on it will be exactly the same in all the cylinders 6 and the flow of the water through each valve will be exactly the same, thus securing complete and effective control from a central point and avoiding multiplication of devices and also avoiding the use of springs.

The source of fluid pressure supply is a circular reservoir 40. Pressure is maintained therein by the pipe 41, or by a more direct connection to a suitable compressor, not shown, or to a larger tank, or to a city water main where the pressure is hydraulic. Arranged about the reservoir 40 are a series of three-way cocks 42, which are controlled by a gear 43. This gear 43 is actuated by a worm 44, which worm is in turn actuated by a worm gear 45, which is driven by a worm 46, which worm is driven by suitable belt connection 47 to an electric motor 48. The group of three-way cocks 42 (four in this instance), are geared so as to open and close successively at regular intervals. One of my devices giving especially good satisfaction, is timed to open each of four three-way cocks once in four minutes. Of course, when the three-way cock in any particular group is opened to the air, the fluid pressure is at once relieved in said three way cock and in the connections thereto and the group of spray heads connected therewith, and the piston 4' is pushed into the cylinder 6, of each of the spray heads of that group by the action of the water against the valve 4, which at once flushes the valve and frees it entirely from all sediment. As soon as the three-way cock is opened to the fluid supply again, the valve is pushed to position by the fluid pressure and a thin sheet of water is delivered transversely to the head in a manner especially effective for cleansing air that is passing through an air purifier or washer. In some instances, the fluid pressure will be supplied by an air compressor.

In Fig. 4, the connection to the valves is as shown in my Patent No. 962,512, but it is controlled by an electromagnet 23, the core 22 of which is connected by a suitable link 21 to the rod 12 which connects to the actuating lever 11 of one of these valves, such as I illustrate in my patent referred to. A pair of connected parallel rock shafts 20', 13' are provided, having parallel arms 19 and 14 connected by a rod 15 disposed through guide bracket 18. A spring 16 on said rod acts against the collar 17 and abuts against bracket 18. The relation very clearly appears by considering both Figs. 4 and 5. The link 21 is connected to the arm 20 on the rock shaft 20'. The arm 13 on the shaft 15' is connected by link 12 to an arm 11 of a spray head. The electro-magnet is controlled by a time switch 24 which controls the circuit 25—26.

In Fig. 6 is illustrated a structure wherein the cylinder motor is connected by an arm 30 to one of the bell cranks 19—20 and actuates the same in that way. The motor cylinder 27 is provided with a piston 28, which is connected by a piston rod 29 and link 31 to an arm 30, which actuates the bell crank 19—20, as indicated.

In Fig. 7, a pneumatic motor with a diaphragm, in place of a piston, is made use of, the same consisting of a shell 32 with a diaphragm 33 therein contained, which diaphragm is clamped within the shell by the ring 34 which bears the spider 35 through which the pitman or piston rod connections 36 connect by a link 37 to an arm 38 for actuating the bell cranks 19—20 in the same way in which it is actuated by the solenoid appearing in Fig. 4. The details of the parts only are shown and the full connections omitted.

It will, of course, be understood that fluid pressure is to be supplied to the motor cylinder 27 of Fig. 6 or the pneumatic motor of Fig. 7 from some suitable source of fluid pressure such as is shown in Fig. 1. Preferably this is arranged for automatic control at predetermined intervals and in groups. However the spray heads may also be controlled automatically so that all of the spray heads are flushed at once at predetermined intervals rather than in groups. It may also be arranged so that the control of the spray heads is not automatic, that is, it does not occur at predetermined intervals but they may be controlled by the turning of a cock at some distant point, all of the spray heads being controlled from a central point.

The details of the spray head, which is controlled by the electro-magnet and the direct acting motors referred to, appear in Fig. 8, in which an arm 11 is pivoted to actuate the valve which is on the pillar 5'; and on the pillar 5' corresponding to the pillar 5 of the preferred construction, is provided a flange 5", which is acted upon by a coiled spring 5''', all as clearly appears in Fig. 8, and also as appears from the structure of my patent above referred to.

Having thus described my invention, what I claim as new and desire to secure by Letters Patent is:

1. In a spraying device, the combination of a group of spray heads; valve disks therefor; pistons carried by said valve disks; suitable cylinders for receiving said pistons within which the same are adapted to reciprocate; connections between said cylinders and a source of pressure fluid to supply pressure fluid to said pistons for forcing said valve disks yieldingly into place in the spray heads, whereby such valves may yield to pressure from within said spray heads to permit a spray discharge; suitable cocks for controlling the fluid supply to said cylinders; and mechanism for controlling the said spray heads in groups, all coacting substantially as described and for the purpose specified.

2. In a spray device for a multiple nozzle structure, the combination of a suitable spray head; a disk valve closing the end thereof; a piston directly connected to said valve; means of supplying fluid pressure to said piston to hold the said valve yieldingly in position, whereby such valve may yield to pressure from within said spray head to permit a spray discharge; and means for relieving said fluid pressure to permit said valve to open and discharge freely to flush and clear the same, coacting for the purpose specified.

3. In a spray device for a multiple nozzle structure, the combination of a suitable spray head; a disk valve closing the end thereof; a motor directly connected to said valve; means of supplying fluid pressure to said motor to hold the said valve yieldingly in position, whereby such valve may yield to pressure from within said spray head to permit a spray discharge; and means for relieving said fluid pressure to permit said valve to open and discharge freely to flush and clear the same, coacting for the purpose specified.

4. In a multiple nozzle structure, the combination of a spray head, a valve disk comprising a parabolic curved surface extending into the said spray head and a lateral right angle flange beyond the head; a piston motor connected directly to said valve; and means of supplying fluid thereto under pressure to regulate the said valve and hold it yieldingly in place, whereby such valve may yield to pressure from within said spray head to permit a spray discharge, coacting for the purpose specified.

5. In a spraying device, the combination of a suitable water main, spray heads connected therewith with movable disk valves therefor, means for applying pressure to said valves to hold them yieldingly in position to permit a spray discharge from said main, and means for relieving said pressure periodically to permit the opening and flushing of said spray heads, all coacting substantially as described and for the purpose specified.

6. In a spraying device, the combination of a spray head, a movable disk valve for said spray head, a piston carried by said disk valve, means for applying pressure to said piston to force said disk valve yieldingly into engagement with said spray head to permit a spray discharge, and means for automatically relieving said pressure at predetermined intervals to permit the opening and flushing of said spray head, all coacting substantially as described for the purpose specified.

7. In a spraying device, the combination of a spray head, a movable disk valve therefor, means forcing said disk valve into engagement with said spray head to permit a spray discharge, and automatic means permitting said valve disk to move away from said spray head at predetermined intervals to open and flush the same, all coacting substantially as described for the purpose specified.

In witness whereof, I have hereunto set my hand and seal in the presence of two witnesses.

DANIEL M. LUEHRS. [L. S.]

Witnesses:
C. P. TAYLOR,
W. H. VAUGHN.